United States Patent
Fourney

(10) Patent No.: US 8,944,236 B2
(45) Date of Patent: Feb. 3, 2015

(54) METHOD AND CONVEYOR FOR REGISTERING ARTICLES ON A CONVEYOR BELT

(71) Applicant: Laitram, L.L.C., Harahan, LA (US)

(72) Inventor: Matthew L. Fourney, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 50 days.

(21) Appl. No.: 13/892,940

(22) Filed: May 13, 2013

(65) Prior Publication Data

US 2014/0332345 A1 Nov. 13, 2014

(51) Int. Cl.
*B65G 47/29* (2006.01)
*B65G 13/06* (2006.01)

(52) U.S. Cl.
CPC .................................... *B65G 13/06* (2013.01)
USPC .......................... 198/459.6; 198/779; 198/697

(58) Field of Classification Search
USPC ................. 198/779, 459.6, 459.7, 461.1, 697
See application file for complete search history.

(56) References Cited

U.S. PATENT DOCUMENTS

| | | | |
|---|---|---|---|
| 6,318,544 B1 | 11/2001 | O'Connor et al. | |
| 6,390,285 B2 | 5/2002 | deGeus et al. | |
| 7,040,480 B2 | 5/2006 | Sedlacek | |
| 7,311,192 B2 * | 12/2007 | Fourney | 198/779 |
| 7,506,750 B2 | 3/2009 | Costanzo et al. | |
| 7,537,105 B2 * | 5/2009 | Fourney | 198/732 |
| 7,770,718 B2 | 8/2010 | Fourney | |
| 7,775,345 B2 | 8/2010 | Fourney | |
| 7,861,849 B2 | 1/2011 | Fourney | |
| 8,109,384 B2 | 2/2012 | Pressler et al. | |
| 8,365,902 B2 | 2/2013 | Costanzo et al. | |
| 8,544,634 B2 * | 10/2013 | Fourney | 198/779 |
| 8,701,871 B2 * | 4/2014 | Fourney | 198/779 |
| 2005/0072656 A1 | 4/2005 | Costanzo | |
| 2007/0221471 A1 | 9/2007 | Fourney et al. | |
| 2008/0121498 A1 * | 5/2008 | Costanzo et al. | 198/779 |
| 2010/0038209 A1 * | 2/2010 | Risley | 198/459.7 |
| 2011/0108396 A1 | 5/2011 | Costanzo et al. | |
| 2012/0241292 A1 | 9/2012 | Fourney | |
| 2012/0285799 A1 | 11/2012 | Fourney | |

FOREIGN PATENT DOCUMENTS

EP   2263953 A1   12/2010

OTHER PUBLICATIONS

International Search Report and Written Opinion of the International Searching Authority, PCT/US2014/036946, mailed Sep. 12, 2014, Korean Intellectual Property Office, Republic of Korea.

* cited by examiner

*Primary Examiner* — James R Bidwell
(74) *Attorney, Agent, or Firm* — James T. Cronvich

(57) ABSTRACT

Method and a conveyor for registering articles on a conveyor belt. The conveyor includes a registration belt having retractable flights regularly spaced along the length of the belt and article-propelling rollers between consecutive flights. The flights are raised in an upstream portion of the conveyor, and the rollers rotated to propel articles forward against the raised flights. In a downstream portion of the conveyor, a flat-top belt under the conveyor belt runs faster than the conveyor belt and causes the flights to lower and the rollers behind the lowering flights to rotate in reverse to urge the articles away from interfering with the lowering flights.

6 Claims, 2 Drawing Sheets

METHOD AND CONVEYOR FOR REGISTERING ARTICLES ON A CONVEYOR BELT

BACKGROUND

The invention relates to power-driven conveyors generally and in particular to belt conveyors with article-propelling rollers and retractable flights.

Registration belts are used to accurately space conveyed articles. One example of a registration belt has retractable flights spaced at regular intervals and in-line rollers between consecutive flights. A bearing surface under the belt raises the flights to a blocking position by cam action. As the belt passes over the bearing surface, the belt rollers rotate on the bearing surface and propel conveyed articles forward in the direction of belt travel into registration against a raised flight. At the end of the belt's carryway run, the registered articles' positioning against the flight can interfere with the flight's closing.

SUMMARY

A method embodying features of the invention for registering articles on a conveyor belt comprises: (a) conveying articles atop rollers in a conveyor belt advancing downstream in a direction of belt travel on an upper run; (b) propelling the articles forward relative to the conveyor belt by rotating the rollers in a forward direction in the direction of belt travel in an upstream portion of the upper run; (c) raising flights disposed at spaced apart positions along the length of the conveyor belt to a raised position in the upstream portion of the upper run; (d) lowering the flights in a downstream portion of the upper run; and (e) reversing the direction of rotation of the rollers in the downstream portion of the upper run to urge articles away from the lowering flights to allow the flights to lower without being obstructed by the conveyed articles.

In another aspect of the invention, a conveyor embodying features of the invention comprises a conveyor belt advancing at a certain speed in the direction of belt travel downstream along an upper run. The conveyor belt includes flights disposed at spaced apart positions along the length of the belt. The flights have lower contact elements that extend below the conveyor belt and upper portions that are retractable from a raised position blocking conveyed articles atop the conveyor belt to a lowered position allowing conveyed articles to pass over. Rollers extend through the thickness of the conveyor belt between the spaced apart locations of the flights. An immobile bearing surface lies under the conveyor belt along an upstream portion of the upper run. Contact between the immobile bearing surface and the contact elements of the flights raises the upper portions of the flights to the raised position. Contact between the immobile bearing surface and the rollers causes the rollers to rotate in a forward direction pushing articles atop the roller downstream in a direction of belt travel. A flat-top belt is disposed under the top run downstream of the immobile bearing surface. The belt has an outer surface that contacts the contact elements and the bottoms of the rollers. The flat-top belt advances in the direction of belt travel of the conveyor belt at a speed greater than the speed of the conveyor belt. Contact between the outer surface of the flat-top belt and the contact elements causes the flights to lower. Contact between the outer surface of the flat-top belt and the rollers changes the direction of rotation of the rollers to a reverse direction opposite to the direction of belt travel. The rollers, rotating in reverse, urge articles away from the lowering downstream flights. In this way, the flights can lower to their lowered position without being obstructed by the conveyed articles.

DETAILED DESCRIPTION

Figure 1:
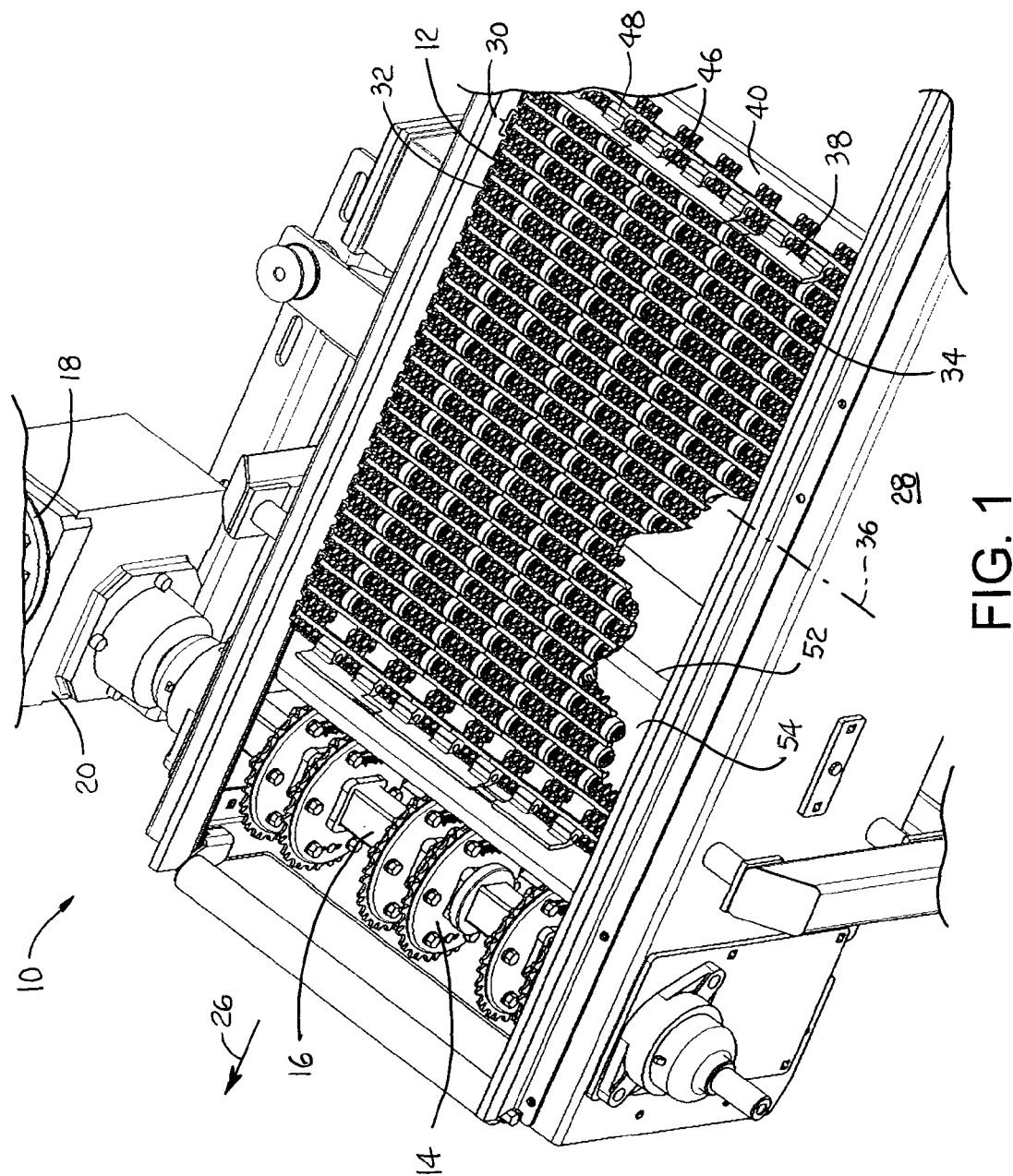
FIG. 1 is an isometric view, partly cut away, of a portion of a registration conveyor embodying features of the invention.
Figure 2:
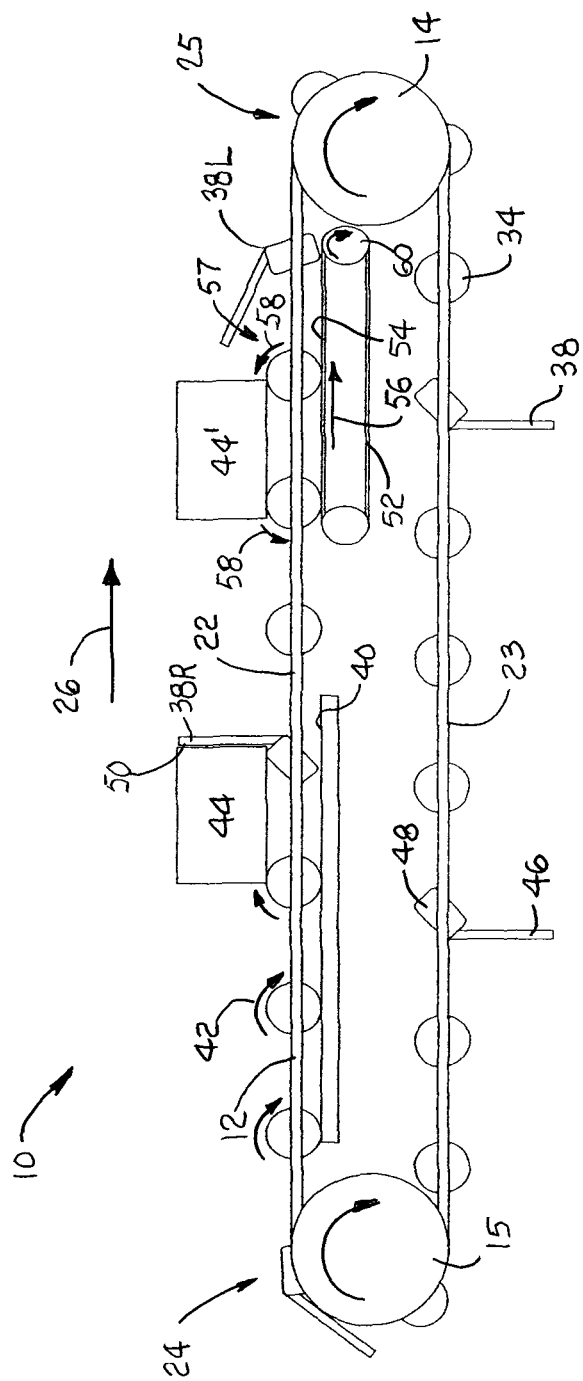
FIG. 2 is a side elevation schematic of the conveyor of FIG. 1.

A registration conveyor embodying features of the invention is shown in FIGS. 1 and 2. The conveyor 10 includes a registration conveyor belt 12 whose inner side is engaged and driven by a drive system that includes, in this example, a set of drive sprockets 14 mounted on a drive shaft 16 and driven by a motor 18 through a gear box 20. The endless conveyor belt 12 is trained between the drive sprockets 14 and idle sprockets 15 at opposite ends of the conveyor. (The conveyor belt 12 is shown cut away in FIG. 1 to reveal underlying components.) The motor 18 drives the conveyor belt 12 along an upper run 22 from an upstream end 24 to a downstream end 25 in a direction of belt travel 26. The drive sprockets 14 serve as reversing elements that reverse the direction of the conveyor belt 12 from the upper run 22 to a lower return run 23. The conveyor belt and all its drive components are mounted in a conveyor frame 28.

The conveyor belt 12 is shown as a modular plastic conveyor belt constructed of a series of rows 30 of one or more belt modules linked at hinge joints 32 by hinge rods. Rollers 34 are mounted on the hinge rods at the hinge joints 32 to rotate on axes 36 perpendicular to the direction of belt travel 26. Cam-actuated retractable flights 38 are also mounted on the hinge rods at regular spaced apart positions along the length of the conveyor belt 12. But it would be possible for the flights and rollers to have dedicated axles or rods that provide pivot axes 36 perpendicular to the direction of belt travel 26. The rollers 34 are arranged in rows across the width of the belt and in lanes, or columns, along the length of the belt between consecutive flight positions. One example of such a conveyor belt is the INTRALOX® Series 900 Registration belt manufactured and sold by Intralox, L.L.C. of Harahan, La., U.S.A.

Supporting the registration conveyor belt in an upstream portion of the conveyor 10 is a stationary, or immobile, bearing surface 40 mounted in the frame 28. Although shown as a flat plate or pan in the drawings, the bearing surface could instead be realized as longitudinal strips aligned with the columns of rollers 34. The bearing surface 40 lies under the upper run 22 of the conveyor belt 12. The belt's rollers 34 ride on the immobile bearing surface 40 as the belt 12 advances in the direction of belt travel 26. The engagement of the rollers 34 with the bearing surface 40 causes the rollers to rotate in the direction of arrows 42, which propel articles 44 forward against a raised flight 38R.

The flights 38 have an upper portion 46 connected to a lower contact elements 48, which can be, for example, a cam follower having a cam surface or a roller having a rolling surface, pivotally attached to the conveyor belt at, for example, the hinge rod. In this example, the contact element 48 is illustrated as a cam follower that extends below the bottom of the conveyor belt 12. Contact between the immobile bearing surface 40 and the cam followers 48 along the upper run 22 pivots the flights 38 to lift them to their raised positions, as indicated by the raised flight 38R. Thus, the contact elements present contact surfaces that receive a force by contact with the bearing surface. The force acting against the contact surfaces of the contact elements causes the flights to be lifted to their raised positions by lever action in the case of cam-follower contact elements, by rotational action in the case of roller contact elements, or otherwise. The rear faces 50 of the raised flights mark registration positions on the conveyor belt 12. The forward-rotating rollers in the upstream portion of the upper run 22 propel the articles 44 forward into registration against a leading raised flight 38R.

A short length of an endless flat-top belt 52 is mounted in the conveyor frame 28 in a downstream portion of the conveyor 10. The flat-top belt 52 has a flat outer surface 54, which could be a high-friction surface. The outer surface 54 of the flat-top belt's upper run provides a mobile bearing surface that contacts the contact elements 48 and the bottoms of the belt rollers 34. The flat-top belt 52 is driven in the direction of belt travel 26 of the conveyor belt 12, as indicated by arrow 56, but at a greater speed. A drive pulley or sprocket 60 may be driven by a dedicated motor or coupled to the main drive motor 18 by a jack shaft or the like to drive the flat-top belt. Because the speed of the flat-top belt 52 in the direction of belt travel 26 exceeds that of the conveyor belt 12, the flights 38L start to lower by pivoting counterclockwise in FIG. 2 as indicated by arrow 57, and the belt rollers 34 reverse directions as indicated by arrows 58. The reverse rotation 58 of the belt rollers 34 pushes against the article 44' rearward relative to the conveyor belt 12 opposite to the direction of belt travel 26 to urge the article away from the lowering flight by either decelerating an article still moving toward the flight or pushing an article registered against the flight rearward out of the path of the lowering flight. In that way, the article 44' avoids obstructing the lowering of the flight 38L to its completely lowered position, i.e., with its upper portion 46 lying flat on the outer surface of the conveyor belt 12. The linear extent of the flat-top belt 52 in the direction of belt travel is relatively short so that the retreat of the articles from the registration position at the flights 38 is small. The linear extent of the immobile bearing surface 40 in the direction of belt travel can be greater than that of the flat-top belt 52.

In most instances, the flat-top belt 52 is positioned under the upper run 22 of the conveyor belt 12 close to the drive sprockets 14. In fact, the smaller drive pulleys or sprockets 60 of the flat-top belt 52 could be positioned to have some vertical overlap with the conveyor belt's larger-diameter drive sprockets 14. With the short flat-top belt positioned close to the downstream end 25 of the upper run 22, the articles are positioned only slightly behind their registration positions, which gives the flights room to lower completely without interference. The fully retracted flights allow the articles to transfer off the downstream end 25 of the conveyor 10 across a small gap.

What is claimed is:

1. A method for registering articles on a conveyor belt, comprising:
conveying articles atop rollers in a conveyor belt advancing downstream in a direction of belt travel along an upper run;
propelling the articles forward relative to the conveyor belt by rotating the rollers in a forward direction in the direction of belt travel in an upstream portion of the upper run;
raising flights disposed at spaced apart positions along the length of the conveyor belt to a raised position in the upstream portion of the upper run to stop the articles being propelled forward at the positions of the flights;
lowering the flights in a downstream portion of the upper run;
reversing the direction of rotation of the rollers in the downstream portion of the upper run to urge articles away from the lowering flights to allow the flights to lower without being obstructed by conveyed articles.

2. The method of claim 1 comprising:
contacting the bottoms of the rollers and the flights with a bearing surface under the upper run of the conveyor belt in the downstream portion;
advancing the bearing surface in the direction of belt travel at a speed greater than the speed of the conveyor belt in the direction of belt travel.

3. The method of claim 1 comprising:
contacting the bottoms of the rollers and the flights with an immobile bearing surface under the upper run of the conveyor belt in the upstream portion.

4. A conveyor comprising:
a conveyor belt advancing at a first speed in a direction of belt travel downstream along an upper run, the conveyor belt including:
a plurality of flights disposed at spaced apart positions along the length of the conveyor belt, wherein the flights have lower contact elements extending below the conveyor belt and upper portions retractable from a raised position blocking conveyed articles atop the conveyor belt to a lowered position allowing conveyed articles to pass over the flights; and
a plurality of rollers extending through the thickness of the conveyor belt between the spaced apart positions of the flights;
an immobile bearing surface lying under the conveyor belt along an upstream portion of the upper run, wherein contact between the immobile bearing surface and the contact elements of the flights raises the upper portions of the flights to the raised position and wherein contact between the immobile bearing surface and the rollers causes the rollers to rotate in a forward direction pushing articles atop the rollers along the conveyor belt downstream in the direction of belt travel;
a flat-top belt disposed under the top run of the conveyor belt downstream of the immobile bearing surface and having an outer surface contacting the contact elements and the bottoms of the rollers;
wherein the flat-top belt advances in the direction of belt travel of the conveyor belt at a second speed greater than the first speed so that the contact between the outer surface of the flat-top belt and the contact elements causes the flights to lower and the contact between the outer surface of the flat-top belt and the rollers changes the rotation of the rollers to a reverse direction opposite to the direction of belt travel to urge conveyed articles away from the lowering downstream flights to allow the flights to lower to their lowered position without being obstructed by conveyed articles.

5. A conveyor as in claim 4 wherein the flat-top belt extends a first distance in length in the direction of belt travel and the immobile bearing surface extends a second distance in the direction of belt travel, wherein the second distance is greater than the first distance.

6. A conveyor as in claim 4 further comprising a reversing element at a downstream end of the upper run engaging the conveyor belt and directing it from the upper run to a lower return run, wherein the flat-top belt overlies a portion of the reversing element.

* * * * *